4 Sheets—Sheet 1.

C. W. SIEMENS.

REGENERATOR-FURNACES.

No. 7,863. Reissued Aug. 28, 1877.

*Witnesses.*

Joseph G. Wildman

W. J. Hutchinson

*Inventor.*

Charles William Siemens by Charles S. Whitman attorney

4 Sheets—Sheet 2.

C. W. SIEMENS.

REGENERATOR-FURNACES.

No. 7,863. Reissued Aug. 28, 1877.

*Witnesses.*

G. C. Wildman

W. T. Hutchinson

*Inventor.*

Charles William Siemens by Charles S. Whitman

Attorney

4 Sheets—Sheet 3

C. W. SIEMENS.

REGENERATOR-FURNACES.

No. 7,863. Reissued Aug. 28, 1877.

Witnesses.
Joseph R. Wildman
W. T. Hutchinson

Inventor.
Charles William Siemens
by Charles S. Whitman
Attorney

4 Sheets—Sheet 4.

C. W. SIEMENS.

REGENERATOR-FURNACES.

No. 7,863. Reissued Aug. 28, 1877.

*Witnesses.*

Joseph C. Hildmann

W. T. Hutchinson

*Inventor.*

Charles William Siemens by Charles S. Whitman attorney

UNITED STATES PATENT OFFICE.

C. WILLIAM SIEMENS, OF WESTMINSTER, ENGLAND.

IMPROVEMENT IN REGENERATOR-FURNACES.

Specification forming part of Letters Patent No. 89,441, dated April 27, 1869; Reissue No. 7,863, dated August 28, 1877; application filed December 5, 1876.

DIVISION B.

*To all whom it may concern:*

Be it known that I, CHARLES WILLIAM SIEMENS, of Westminster, county of Middlesex, England, have invented certain Improvements in Regenerative Gas-Furnaces.

The following description, taken in connection with the accompanying plate of drawings, hereinafter referred to, forms a full and exact specification, wherein are set forth the nature and principles of the invention, by which the same may be distinguished from others for which Letters Patent have heretofore been granted, together with such part thereof as I claim as new and desire to secure by reissued Letters Patent of the United States.

My invention relates to that class of furnaces known as regenerative gas-furnaces, for which Letters Patent of the United States were granted on the 1st day of March, 1864; and the nature thereof consists, first, in so constructing the air and gas regenerators that the arithmetical ratio of the space occupied by the air-regenerators and the space occupied by the gas regenerators, as measured by cubic units, shall be substantially the same as the ratio of the volume of air and the volume of gas required to insure complete combustion; secondly, in the arrangement of the flues leading from the regenerators to the furnace, whereby the heated air is introduced into the furnace at a level superior to that at which the gases enter; thirdly, in combining with the regenerators a series of partition-walls, for the purpose of separating the air-flues from the gas-flues and arranging them parallel to each other; fourthly, in the method of supporting the furnace by means of buck-staves and tie-rods passing through the ventilating-space below the furnace-bottom; fifthly, in combining with the regenerative furnace a ladle, mounted on wheels, for collecting and thoroughly mixing the molten material before pouring, substantially as herein described.

Figure 1:
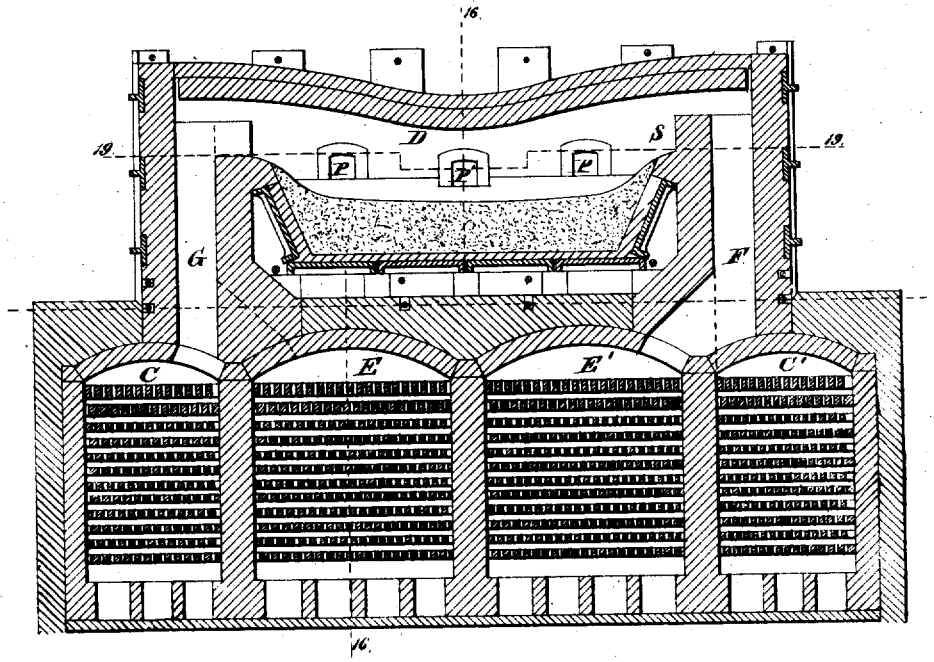
Figure 2:
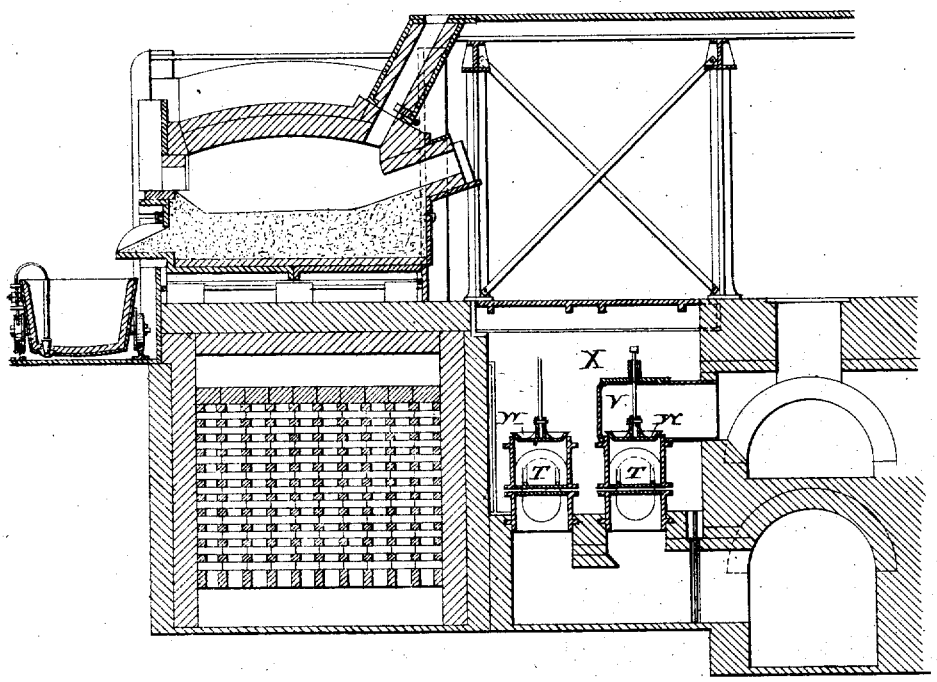
Figure 3:
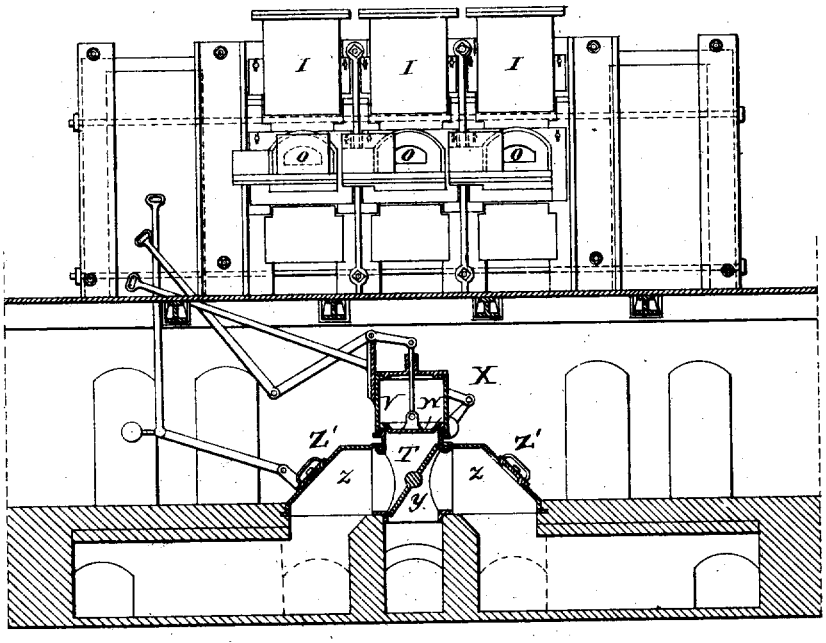
Figure 4:
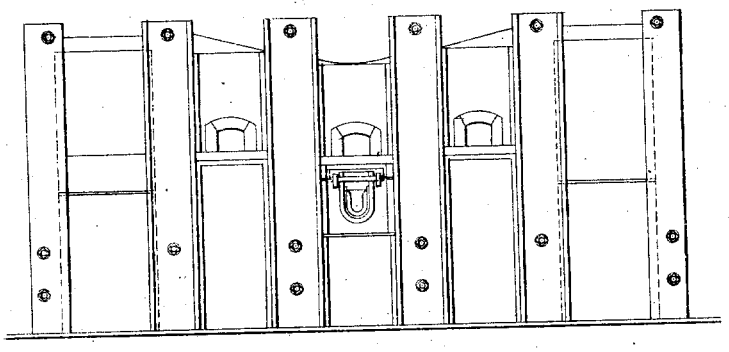
Figure 5:
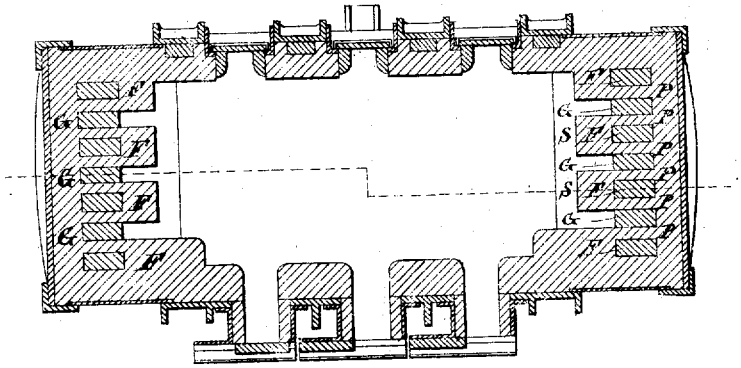

In the accompanying plate of drawings, in which corresponding parts are designated by similar letters, Figure 1 denotes a longitudinal section of the furnace. Fig. 2 is a transverse section on line 16 16, Fig. 1. Fig. 3 represents a rear elevation and a section through the gas-passages. Fig. 4 is a front elevation. Fig. 5 is a sectional plan taken on line 19 19, Fig. 1.

In the regenerative gas-furnace the gas and air employed are separately heated by the waste heat of the flame, by means of what are termed "regenerators," placed usually beneath the furnace. These are four separate chambers, C C′ E E′, carefully built of fire-brick, and the wall whitewashed inside, so as to avoid any leakage from one chamber to the other. They are worked in pairs, so that one pair, *e. g.*, C E, is being constantly heated by the products of combustion on their way to the chimney, while the other pair, C′ E′, is giving up the heat so obtained to the incoming gas and air.

These four chambers are filled with fire-brick, or other refractory and suitable material, stacked loosely together. The waste gases from the furnace are drawn down through one pair of regenerators, and heat the upper rows of bricks to a temperature little short of that in the furnace itself. They then pass over cooler surfaces, and escape at length to the chimney-flue nearly cold. The current of hot gases is continued down through this pair until a considerable depth of brick-work near the top is uniformly heated to a temperature nearly equal to that of the entering gas, the heat of the lower portion decreasing gradually downward at a rate depending on the velocity of the current and the size and arrangement of the bricks. The direction of the draft is then reversed, the current of heated waste gases is employed to heat up the second pair of regenerators, and the gas and air entering the furnace are passed in the opposite direction through the first pair, and, coming into contact, in the first instance, with the cooler brick-work below, are gradually heated as they ascend, until at some distance from the top they attain a temperature nearly equal to the initial heat of the waste gases, and passing up into the furnace meet and at once ignite, producing a strong flame, which, after passing through the heating-chamber, is drawn down to heat the second pair of regenerators, and thence passes to the chimney-flue. The temperature attained by the ascending gas and air remains practically constant, for while one pair of regenerators is being heated the other pair is correspondingly cooled. The air and gas thus flow in a natural manner, being heated as they ascend, and cooled in their descent, so that an artificial draft is only required to draw off the waste gases from the regenerators.

By reversing the direction of the draft at suitable intervals, nearly all the heat is retained in the furnace that would otherwise be carried off by the products of combustion.

When the heat of the furnace is not abstracted continually by work performed in the heating-chamber, the temperature necessarily increases after each reversal, as only a very small fraction of the heat generated is carried off to the chimney by the waste gases.

The gas and air in rising through the regenerator are heated to a temperature nearly equal to that which the flame had when passing down, and when they meet and burn in the furnace the heat of combustion is added to that carried up from the regenerators, and the flame is necessarily hotter than before, and raises the second pair of regenerators to a higher heat. On again reversing, this higher heat is communicated to the gas and air passi g in, and a still hotter flame is the result.

The advantages of a furnace of the construction above described are that the heat can be raised to an almost unlimited degree; that the flame can be made, at will, oxidizing, neutral, or reducing; that indraft of air and cutting-flames are avoided; and that the gaseous fuel is free from ashes, dust, and other impurities.

In order to render these advantages thoroughly available for metallurgical furnaces, to produce a heating-flame of the proper length and direction, to mix the air and gas at the very point at which the heat is required, or where it is taken up at once by the materials to be heated or fused, to throw the most intense heat upon the charge, to make the bed of the furnace sufficiently refractory, to prevent the mixture of air and gas until they reach the interior of the heating chamber, to construct the gas and air regenerators of proper size in reference to each other, to prevent bad effects arising from expansion, and to facilitate the working of the regenerators by means of improved valves, I have found by actual experiment that a regenerative gas-furnace different in construction and operation from that heretofore patented by myself and Frederick Siemens is necessary.

Having reference to the accompanying drawings, I will proceed to describe a regenerative gas-furnace having the improvements protected by the present Letters Patent applied thereto.

The regenerative gas-furnace, as shown in the drawings, is built of fire-brick or other suitable refractory material, and consists of the four regenerators with their flues and valves, and the heating-chamber where the metallurgical operations are carried on.

The four regenerators are arranged in pairs and vary in size, the smaller being used for the passage of gas, and the larger for that of air, their proportions being in the ratio of two to three approximately. These ratios correspond to the quantities of gas and air required to insure complete combustion in the heating-chamber. The walls of the regenerators are built of fire-brick, or other suitable refractory material, closely laid and whitewashed, or otherwise made gas-tight, so that no leakage may take place from one chamber to another.

These chambers are filled with reffactory material, by preference fire-brick stacked loosely together, and each regenerative chamber has its own separate flue at the base communicating with the valves by which the gas and air enter or the products of combustion pass out, while from the top or side of each regenerative chamber a flue passes upward and communicates with the heating-chamber; and I prefer to cause the air to enter the heating-chamber above the gas, as by its superior specific gravity, at equal temperatures, it tends to sink through the gas, and thus an intimate mixture and more perfect combustion are obtained.

The entering or issuing gaseous currents pass through valves, which are shown at X in Figs. 2 and 3. Each valve consists of three parts, viz., a central piece, wherein is placed the reversing-flap which directs the course of the currents, and above which is the throttle-valve which regulates the admission of gas and air, and two side boxes, Z Z, furnished with covers Z′ Z′ for cleaning purposes. These side boxes Z Z are placed between the flues leading to or from the regenerators and the chimney-flue, and in practical working they are of great service, inasmuch as they simplify construction, and prevent overheating and consequent warping of the reversing-flaps. Thus leakage is avoided, the currents are kept separate, and their reversal easily effected.

The heating-chamber, where the metallurgical processes are carried on, has its roof and sides constructed of highly refractory materials, such as best silica or Dynas bricks.

The bed is cooled below by an air-space, and through this space pass special tie-rods, which, together with others above the roof, serve in combination with suitable buckstaves to maintain the whole chamber in a solid condition.

On first lighting the furnace the gas passes through the proper valves and flues into the bottom of the regenerator chamber C, while the air enters through corresponding valves and flues into the regenerator-chamber E, which should be about one-half larger than the gas-regenerator chamber C. The currents of gas and air, both quite cold, rise separately through the regenerators C and E, and pass up through the flues or series of flues G G G and F F F F, respectively, into the furnace above, where they meet and are lighted, burning and producing a moderate heat.

The gas-flues G G G, communicating between the regenerator C and the furnace, are separated from the air-flues F F F F, leading to the regenerator E by a series of partition-walls, P, and the partition-walls S between the air-flues and the furnace are extended upward in such manner that the currents of air from the regenerator E will enter the furnace above the currents of gas from the regenerator C. The products of combustion pass away through a similar set of flues at the other end of the furnace into the regenerator-chambers C′ E′, and thence through properly-constructed flues and valves to the chimney-flue. The waste heat is thus deposited in the upper courses of open fire-brick work, filling the chambers C′ E′, and heats them up, while the lower portion and the chimney-flue are quite cool; then, after a suitable interval, the reversing-flaps, through which the air and gas are admitted or withdrawn from the furnace, are reversed, and the air and gas enter through those regenerator-chambers E′ C′ which have just been heated by the waste products of combustion, and in passing up through the checker-work they become heated, and then, on meeting and entering into combustion in the furnace D, they produce a very high temperature, the waste heat from such higher temperature of combustion heating up the previously cold regenerators C E to a corresponding higher heat. Thus an accumulation of heat and an accession of temperature are obtained step by step, so to speak, until the furnace is as hot as is required. The heat is at the same time so thoroughly abstracted from the products of combustion by the regenerators that the chimney-flue remains comparatively cool. The command of the temperature of the furnace and of the quality of the flame is rendered complete by means of gas and air regulating valves and by the chimney-damper.

Having thus described my invention, I claim and desire to secure by Letters Patent of the United States—

1. A regenerative gas furnace in which the air-regenerator is as much larger than the gas-regenerator as the volume of air required to insure complete combustion is larger than the volume of gas.

2. A regenerative gas-furnace in which the air is introduced at a level superior to that at which the gas enters, as and for the purposes described.

3. A regenerative gas-furnace in which the air-flues are separated from the gas-flues by a series of partition-walls, as and for the purposes described.

4. A regenerative gas-furnace in which both gas and air flues are arranged above the gas-regenerators.

5. A regenerative furnace in which the partition-walls between the air-flues and the furnace, the partition-wall between the flues and the ventilating space, and partition-walls between the air and gas regenerators are arranged in the same vertical plane.

6. A regenerative gas-furnace in which the tie-rods are passed through the ventilating-space below the furnace-bottom, as and for the purposes described.

7. A ladle mounted on wheels, in combination with the regenerative gas-furnace, as and for the purposes described.

In testimony that I claim the foregoing I have hereunto set my hand and seal this 26th day of June, 1876.

C. WILLIAM SIEMENS. [L. S.]

Witnesses:

CHAS. ROCHE,
G. D. DAVIES.